US005197141A

United States Patent [19]

Ito

[11] Patent Number: 5,197,141

[45] Date of Patent: Mar. 23, 1993

[54] SOFTWARE CONTROLLED METHOD OF ISSUING HARDWARE CONTROL COMMANDS TO MEMORY CONTROLLER FROM PREFETCH UNIT BY COMBINING REQUEST CODE AND ADDRESS SPECIFIED IN PROGRAM INSTRUCTIONS

[75] Inventor: Mikio Ito, Tokyo, Japan

[73] Assignee: NEC Corporation, Tokyo, Japan

[21] Appl. No.: 785,229

[22] Filed: Oct. 28, 1991

Related U.S. Application Data

[63] Continuation of Ser. No. 302,347, Jan. 27, 1989, abandoned.

[30] Foreign Application Priority Data

Jan. 30, 1988 [JP] Japan .................... 63-18550
Jan. 30, 1988 [JP] Japan .................... 63-18554

[51] Int. Cl.[5] .................... G06F 9/40; G06F 9/44; G06F 12/00

[52] U.S. Cl. .................... 395/425; 364/238.4; 364/254.8; 364/256.8; 364/261.1; 364/933.5; 364/948; 364/958.5; 364/263.1; 364/961.3; 364/DIG. 1; 395/250; 395/375; 395/400

[58] Field of Search .................... 395/250, 375, 425, 400

[56] References Cited

U.S. PATENT DOCUMENTS

| | | | |
|---|---|---|---|
| 3,949,378 | 4/1976 | Crabb et al. | 340/172.5 |
| 4,068,299 | 1/1978 | Bachman | 364/200 |
| 4,068,300 | 1/1978 | Bachman | 364/200 |
| 4,177,510 | 12/1979 | Appell et al. | 364/200 |
| 4,400,774 | 8/1983 | Toy | 364/200 |
| 4,583,165 | 4/1986 | Rosenfeld | 364/200 |
| 4,742,452 | 5/1988 | Hirokawa | 364/200 |
| 4,797,813 | 1/1989 | Igarashi | 364/200 |
| 4,831,515 | 5/1989 | Kamada et al. | 364/200 |
| 4,916,606 | 4/1990 | Yamaoka et al. | 364/200 |
| 4,954,944 | 9/1990 | Ikeda | 364/200 |

*Primary Examiner*—Lawrence E. Anderson
*Assistant Examiner*—Ken S. Kim
*Attorney, Agent, or Firm*—Foley & Lardner

[57] ABSTRACT

A request is issued in response to an instruction to a memory buffer control unit in accordance with one of first and second specific access methods. The request comprises a request code and a memory address. The first specific access method comprises the steps of holding preliminarily the request code in a register, producing the memory address by using an address syllable included in the instruction, and delivering the memory address and the request code held in the register to the memory buffer control unit. The second specific access method comprises the steps of holding preliminarily indication data in a register, judging whether or not an address syllable has in the instruction a base register number equal to a specific number, producing an effective address by using the address syllable, and delivering the request code and the memory address to the memory buffer control unit by using the indication data held in the register and the effective address when the base register number is equal to the specific number.

9 Claims, 11 Drawing Sheets

OPERATION CODE FIELD
33
MBU REQUEST CODE INDICATING FIELD
34

O P
MRCD

OPERATION CODE FIELD
35
ADDRESS SYLLABLE
36 AS

O P
B
X
D
BASE REGISTER NUMBER INDICATING FIELD
37
38
INDEX REGISTER NUMBER INDICATING FIELD
39
DISPLACEMENT INDICATING FIELD

SOFTWARE CONTROLLED METHOD OF ISSUING HARDWARE CONTROL COMMANDS TO MEMORY CONTROLLER FROM PREFETCH UNIT BY COMBINING REQUEST CODE AND ADDRESS SPECIFIED IN PROGRAM INSTRUCTIONS

This application is a continuation of application Ser. No. 07/302,347, filed Jan. 27, 1989, now abandoned.

BACKGROUND OF THE INVENTION

This invention relates to a method of issuing a request to a memory buffer control unit.

A data processing system usually comprises a main memory unit (MEM), a central processing unit (CPU), and a system interface unit (SIU) connected between the main memory unit and the central processing unit. The central processing unit comprises a memory buffer control unit (MBU), a prefetch control unit (PFU), and an instruction execution control unit (EXU) which are connected to one another. The prefetch control unit is called an advanced control unit. The central processing unit may be operable under pipeline control. The instruction execution control unit includes a work storage and firmware (FW) or a microprogram control unit which includes a control storage. The memory buffer control unit includes a translation lookaside buffer (TLB). The prefetch control unit includes base registers, general registers, and an address adder for producing an effective address by using an address syllable included in an instruction. The instruction may be one of software (SW) instructions and hardware control software (HCSW) support instructions which will become clear as the description proceeds.

In the data processing system of the type described, a part of the functions of hardware/firmware (HW/FW) has been carried out by the hardware control software in order to reduce the required capacity of the control storage and to facilitate design of the firmware. The hardware control software comprises the SW instructions available to usual software and the HCSW support instructions for exclusive use in the HCSW. Both of the SW instructions and the HCSW support instructions are stored in the main memory unit.

The central processing unit is operable in either an SW mode or an HCSW mode. In the SW mode, the usual software controls an instruction counter, the base registers, the general registers and so on, and the central processing unit operates under the control of the usual software. In the HCSW mode, the hardware control software controls the instruction counter, the base registers, the general registers and so on, and the central processing unit operates under the control of the hardware control software.

In order to obtain an access to the memory buffer control unit, an access request is issued to the memory buffer control unit. The request comprises a request code and a memory address. The memory address may be either the effective address or address path information which are known in the art. Access for the memory buffer control unit (MBU access) can not always be carried out by means of the SW instructions. This is because the SW instructions are composed only of store instructions and load instructions related to access for the memory buffer control unit. An access will be called a specific access when the access cannot be carried out by means of the SW instructions. Otherwise, an access will be referred to as a usual access. The specific access must be carried out by means of the HCSW support instructions.

The specific access has conventionally been made as follows. Such a specific access method will be called a conventional specific access method. At first, a peculiar or particular start address of the control storage for use in the specific access is indicated by an MBU specific access instruction which is one of the HCSW support instruction for the specific access. The firmware starts from the peculiar start address to carry out the specific access. The firmware will be called peculiar firmware when the firmware starts from the peculiar start address. Therefore, the conventional specific access method is disadvantageous in that it takes useless time which is necessary for the peculiar firmware to carry out the specific access if the central processing unit is operable under pipeline control. In addition, the peculiar firmware is necessary to each specific access. Furthermore, it is impossible to effectively utilize the software instructions.

SUMMARY OF THE INVENTION

It is therefore an object of the present invention to provide a specific access method operable without useless time.

It is another object of this invention to provide a specific access method of the type described, in which the peculiar firmware is not necessary to the specific access.

It is still another object of this invention to provide a specific access method of the type described, which can effectively utilize software instructions.

Other objects of this invention will become clear as the description proceeds.

A method to which this invention is applicable, is for issuing a request in response to an instruction to a memory buffer control unit. The request comprises a request code and a memory address. According to an aspect of this invention, the method comprises the steps of preliminarily holding the request code in a register, producing the memory address based on an address syllable included in the instruction, and delivering the memory address and the request code held in the register to the memory buffer control unit. According to another aspect of this invention, the method comprises the steps of holding preliminarily indication data in a register, producing an effective address based on an address syllable, judging whether or not the address syllable in the address syllable in the instruction has a base register number equal to a specific number, and delivering the request code and the memory address to the memory buffer control unit based the indication data held in the register and the effective address when the base register number is equal to the specific number.

DESCRIPTION OF THE PREFERRED EMBODIMENTS

Figure 1:
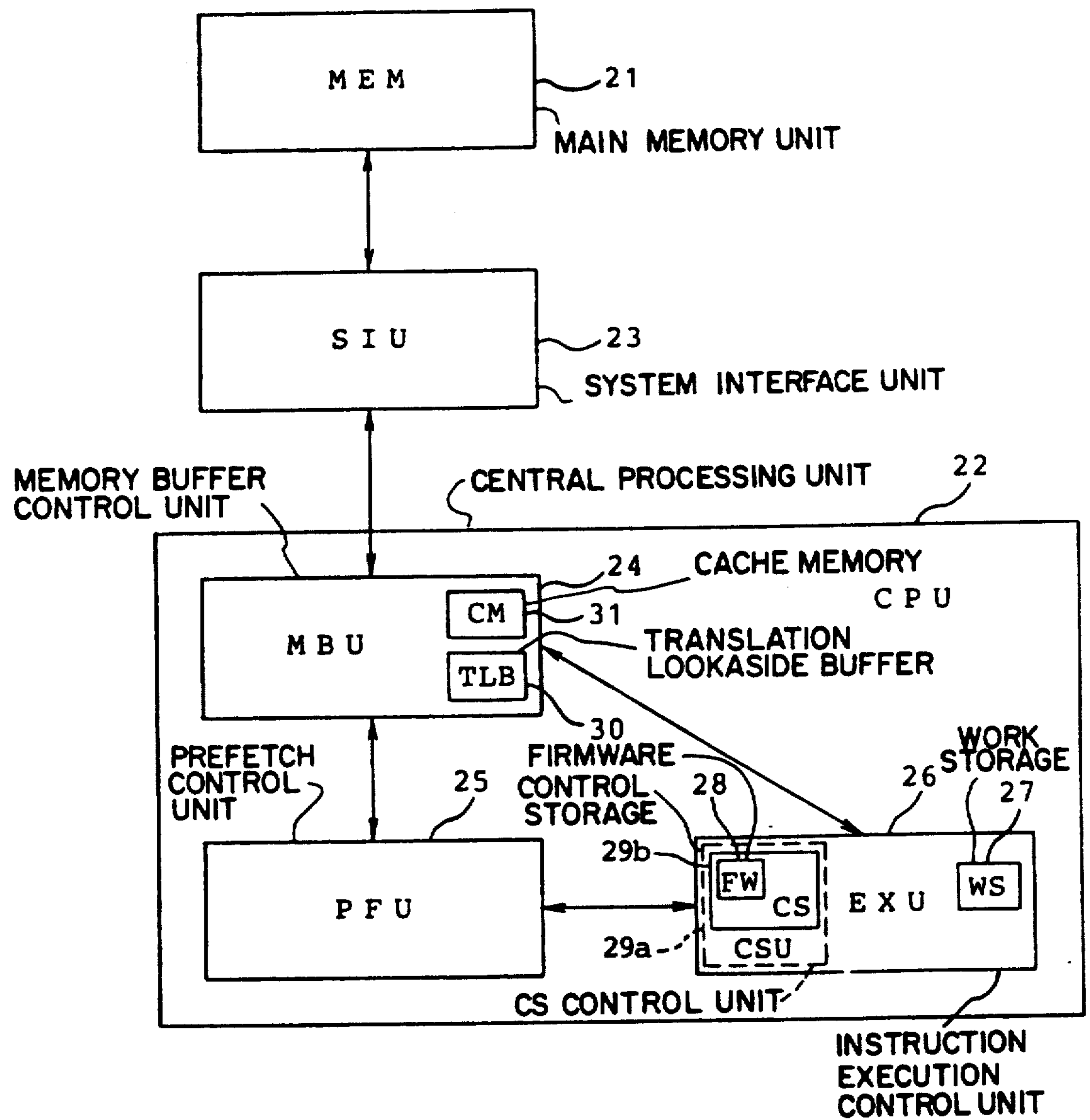
FIG. 1 is a block diagram of a data processing system which includes a prefetch control unit.

Referring to FIG. 1, a data processing system will briefly be described at first in order to facilitate an understanding of a specific access method according to the present invention.

The data processing system comprises a main memory unit (MEM) 21, a central processing unit (CPU) 22, and a system interface unit (SIU) 23 which is connected between the main memory unit 21 and the central processing unit 22. The system interface unit 23 may be connected to a plurality of central processing units and a plurality of input/output control units.

The central processing unit 22 comprises a memory buffer control unit (MBU) 24, a prefetch or an advanced control unit (PFU) 25, and an instruction execution control unit (EXU) 26. The memory buffer control unit 24, the prefetch control unit 25, and the instruction execution control unit 26 are connected to one another.

It will be assumed that the central processing unit 22 is operable under seven-stage pipeline control in the manner which will later be described. The seven-stages of the pipeline control are an instruction decoding (D) stage, an effective address producing (A) stage, a translation lookaside buffer access (T) stage, an operand cache access (0) stage, an operand arrangement (L) stage, an execution (E) stage, and a store (S) stage. The D stage and the A stage are carried out by the prefetch control unit 25. The T stage and the 0 stage are carried out by the memory buffer control unit 24. The L stage, the E stage, and the S stage are carried out by the instruction execution control unit 26.

The instruction execution control unit 26 includes a work storage (WS) 27 and a CS control unit (CSU) 29*a* which are known in the art. The CS control unit 29*a* includes a control storage (CS) 29*b* which is known in the art. The control storage 29*b* includes firmware (FW) 28 which is known in the art. The memory buffer control unit 24 includes a translation lookaside buffer (TLB) 30 and a cache memory (CM) 31 which are known in the art.

Figure 2:
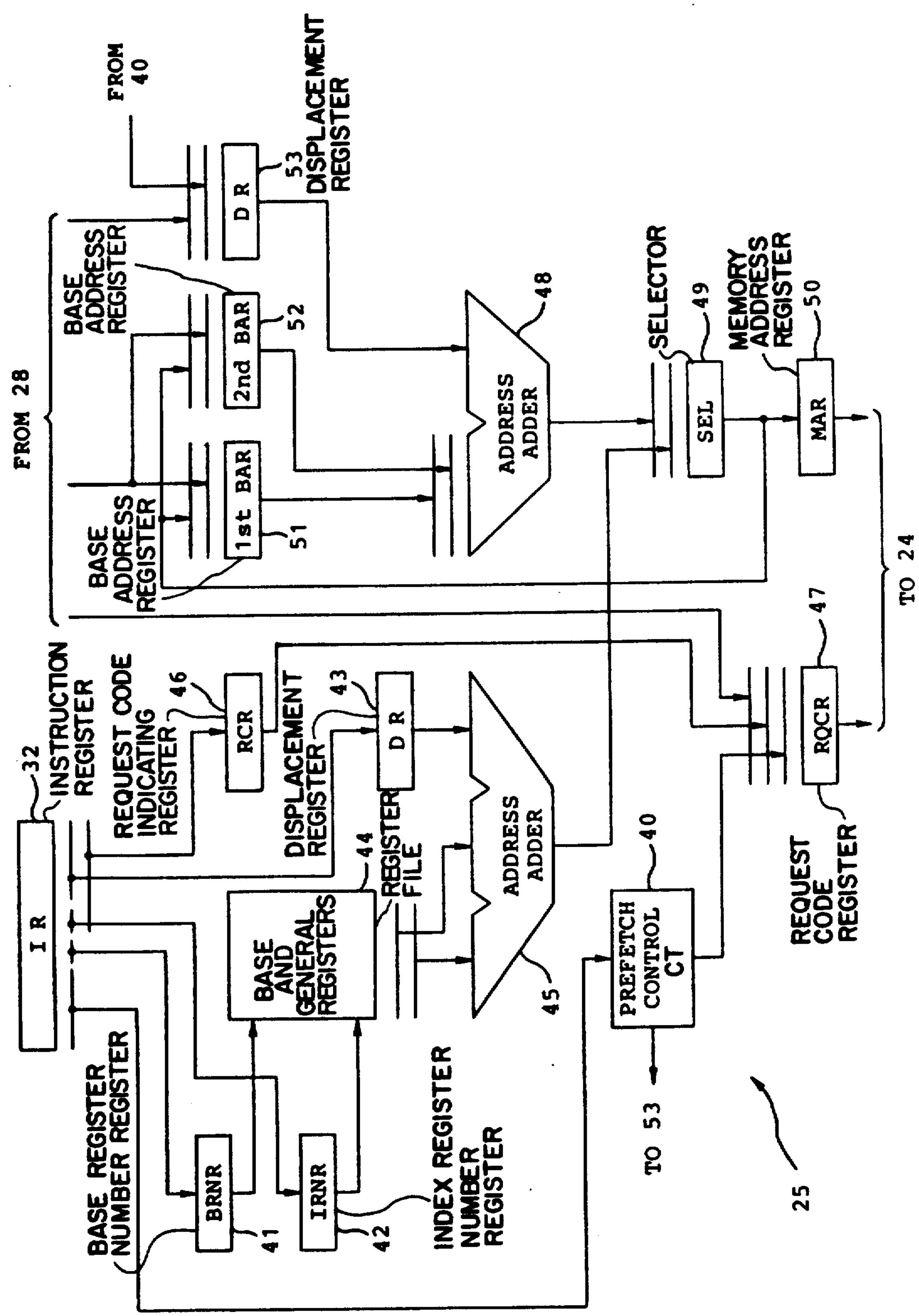
FIG. 2 is a block diagram of a prefetch control unit used in the data processing system depicted in FIG. 1 in carrying out a specific access method according to an embodiment of the instant invention.

Referring to FIG. 2, the prefetch control unit 25 comprises an instruction register (IR) 32 supplied with one of plural instructions. The instructions may be software (SW) instructions or hardware control software (HCSW) support instructions which will be described in detail in the following.

Figure 3A:
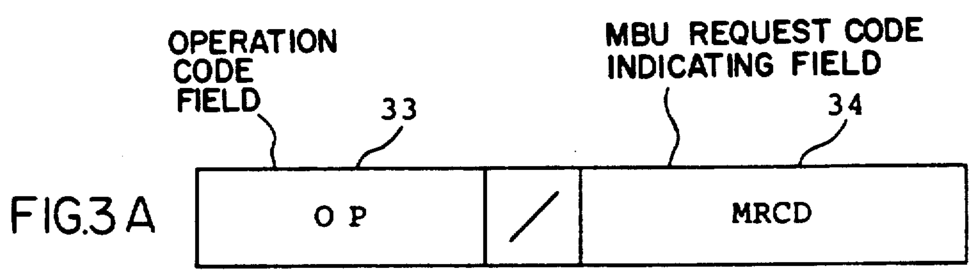
FIGS. 3(A) and (B) show formats of HCSW support instructions for use in the prefetch control unit shown in FIG. 2.

Temporarily referring to FIGS. 3(A) and (B), MBU request code set instructions and MBU specific access instructions are included in the HCSW support instructions. As shown in FIG. 3(A), each MBU request code set instruction comprises an operation code (OP) field 33 and an MBU request code indicating (MRCD) field 34. The MRCD field 34 indicates an MBU request code for making the memory buffer control unit 24 carry out specific process. The specific process is, for example, test and set of lock byte for use in exclusive control, interprocessor communication for carrying out communication between its own central processing unit and another central processing unit, clear of the translation lookaside buffer, load/store of segment descriptor/page descriptor, translation of an effective address to an absolute address, or the like. The OP field 33 indicates an operation code for the MBU request code set instruction.

Figure 3B:
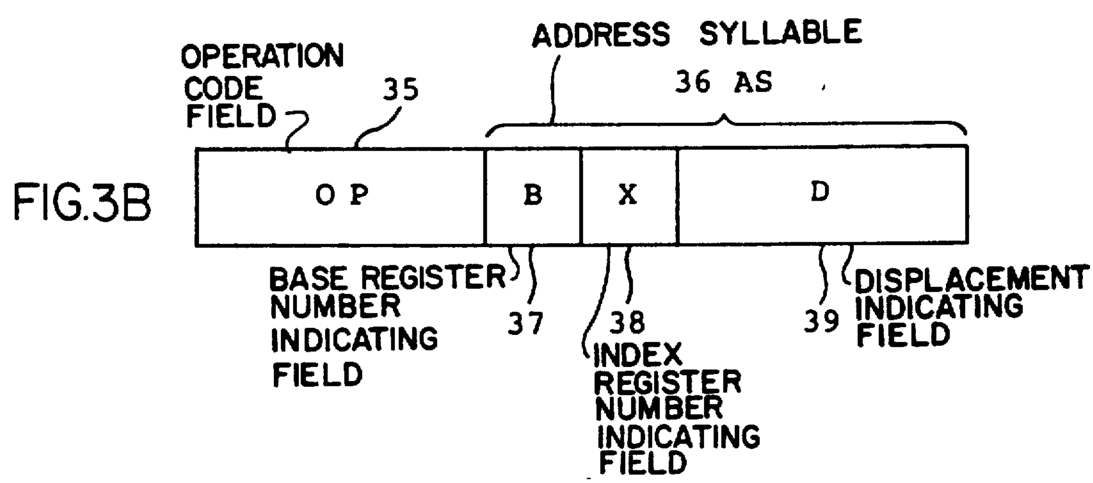

As shown in FIG. 3(B), each MBU specific access instruction comprises an OP field 35 and an address syllable (AS) field 36. The OP field 35 indicates an operation code for producing the effective address and for delivering the MBU request code set by the MBU request code set instruction to the memory buffer control unit. The AS field 36 indicates an address syllable for use in production of the effective address. The AS field 36 comprises a base register number indicating (B) field 37, an index register number indicating (X) field 38, and a displacement indicating (D) field 39. The B field 37 indicates a base register number of one of the base registers. The X field 38 indicates an index register number of one of the general registers. The D field 39 indicates a displacement.

Turning back to FIG. 2, either the MBU request code set instruction or the MBU specific access instruction is set in the instruction register 32. A prefetch or an advanced control circuit 40 is supplied with the OP field of the instruction set in the instruction register 32. The prefetch control circuit 40 decodes the OP field of the instruction and controls operation of instruction prefetch processing. If the instruction set in the instruction register 32 includes the AS field, the prefetch control circuit 40 causes a base register number register (BRNR) 41, an index register number register (IRNR) 42, and a displacement register (DR) 43 to set the B field 37, the X field 38, and the D field 39. At any rate, the base register number, the index register number, and the displacement are set in the base register number register 41, the index register number register 42, and the displacement register 43, respectively.

A register file 44 comprises the base registers (BR's) and the general registers (GR's). The base registers and the general registers are assigned with base register numbers and index register numbers, respectively. One of the base registers is indicated by the base register number set in the base register number register 41 as an indicated base register. Similarly, one of the general registers is indicated by the index register number set in the index register number register 42 as an indicated index register. A three-summand address adder 45 is supplied with the contents of the indicated base register, the contents of the indicated index register, and the displacement set in the displacement register 43. The three-summand address adder 45 calculates a first effective address which is one of the effective addresses. Therefore, a combination of the base register number register 41, the index register number register 42, the displacement register 43, the register file 44, and the address adder 45 acts as a producing arrangement for producing the first effective address by using the address syllable.

If the MBU request code set instruction is set in the instruction register 32, the prefetch control circuit 40 stores the MRCD field 34 of the MBU request code set instruction in a request code indicating register (RCR) 46. At any rate, the request code indicating register 46 is for holding the MBU request code. Held in the request code indicating register 46, the MBU request code is sent to a request code register (RQCR) 47. The request code register 47 is also supplied with MBU request codes from the prefetch control circuit 40 and the firmware 28 (FIG. 1). In the request code register 47 is set an MBU request code which is finally decided as a decided MBU request code. More specifically, the MBU request code held in the request code indicating register 46 is set in the request code register 47 as the decided MBU request code when the MBU specific access instruction is set in the instruction register 32. The MBU request code produced by the prefetch control circuit 40 is set in the request code register 47 as the decided MBU request code when the prefetch control unit 25 carries out an MBU request (access) except for the specific access. Sent from the firmware 28, the MBU request code is set in the request code register 47 as the decided MBU request code when the firmware 28 carries out the MBU request. The decided MBU request code set in the request code register 47 is delivered to the memory buffer control unit 24 (FIG. 1).

A two-summand address adder 48 is supplied with contents of a selected one of first and second registers 51 and 52 and of a third register 53. The contents will presently be described. The address adder 48 produces a renewed memory address for use in renewing a memory address such as a second effective address and the absolute address. The second effective address is one of the effective addresses. The renewed memory address is supplied to a two-input selector 49. The selector (SEL) 49 is supplied with the first effective address from the three-summand address adder 45. The selector 49 selects one of the renewed memory address and the first effective address as a selected memory address. The selected memory address is sent to registers 50 and back to the registers 51 and 52.

The selected memory address is set in the register 50 in the form of a memory address and is finally decided as a decided memory address. The decided memory address is delivered to the memory buffer control unit 24. The register 50 will be called a memory address register (MAR). If the decided memory address includes the effective address, the effective address is used to access the translation lookaside buffer 30 in the memory buffer control unit 24.

In the register 51 is set one of the selected memory address and a memory address sent from the firmware 28 as a base address. The register 51 will be called a first base address register (1st BAR). Similarly, in the register 52 is set one of the selected memory address and a memory address sent from the firmware 28 as a base address. The register 52 will be referred to as a second base address register (2nd BAR). In a register 53 is set one of a displacement sent from the firmware 28 and another displacement sent from the prefetch control circuit 40. The register 53 will be called a displacement register (DR). Responsive to the base address and the displacement, the two-summand address adder 48 calculates the renewed memory address.

Figure 4:
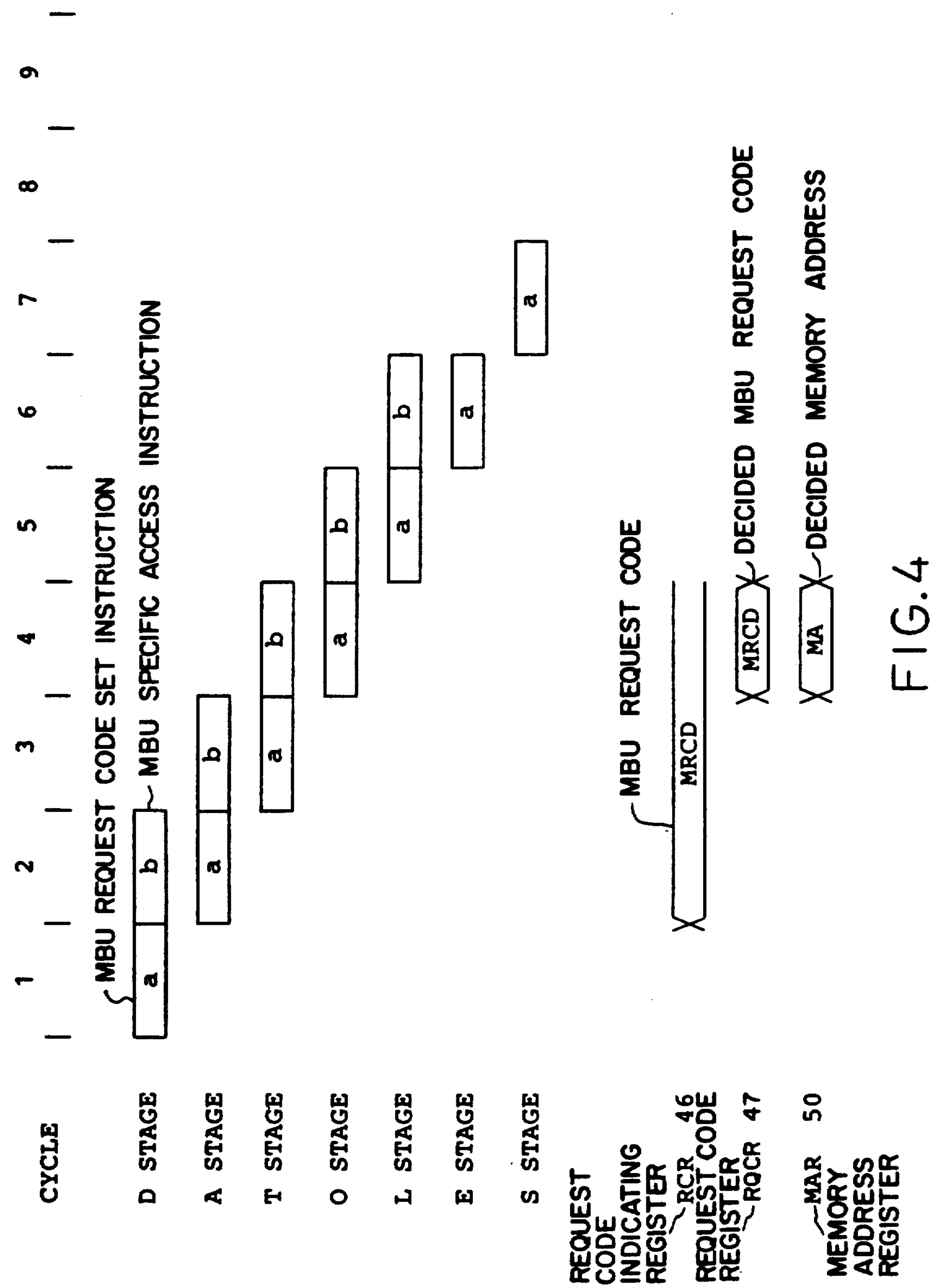
FIG. 4 is a time chart for use in describing the specific access method of the prefetch control unit shown in FIG. 2.

Referring now to FIG. 4, a specific access method of the prefetch control unit 25 of FIG. 2 will be described below. Attention will be directed to the MBU request code set instruction (FIG. 3(A)) and the MBU specific access instruction (FIG. 3(B)). The MBU request code set instruction and the MBU specific access instruction will be denoted by a and b. First through ninth machine cycles are indicated along a first or top line in FIG. 4 by numerals 1 through 9.

In the first machine cycle, the MBU request code set instruction a is set in the instruction register 32. The prefetch control circuit 40 decodes the OP field 33 of the MBU request code set instruction a. The prefetch control circuit 40 stores the MRCD field 34 of the MBU request code set instruction a in the request code indicating register 46 in the next or the second machine cycle.

In the second machine cycle, the MBU specific access instruction b is set in the instruction register 32. Simultaneously, the MBU request code (MRCD) is held in the request code indicating register 46. The prefetch control circuit 40 decodes the OP field 35 of the MBU specific access instruction b. The prefetch control circuit 40 stores the AS field 36, namely, the B field 37, the X field 38, and the D field 39 in the base register number register 41, the index register number register 42, and the displacement register 43 in the next or the third machine cycle.

In the third machine cycle, the base register number, the index register number, and the displacement are set in the base register number register 41, the index register number register 42, and the displacement register 43. The address adder 45 calculates the effective address.

In the fourth machine cycle, the MBU request code of the request code indicating register 46 is set in the request code register 47 as the decided MBU request code (MRCD). Simultaneously, the effective address calculated by the address adder 45 is set in the memory address register 50 through the selector 49 as the decided memory address (MA). The decided MBU request code is delivered to the memory buffer control unit 24. Similarly, the decided memory address is delivered to the memory buffer control unit 24 as the address path information.

Also, the request code indicating register 46 holds the MBU request code until issue of the next MBU request code set instruction.

Figure 5:
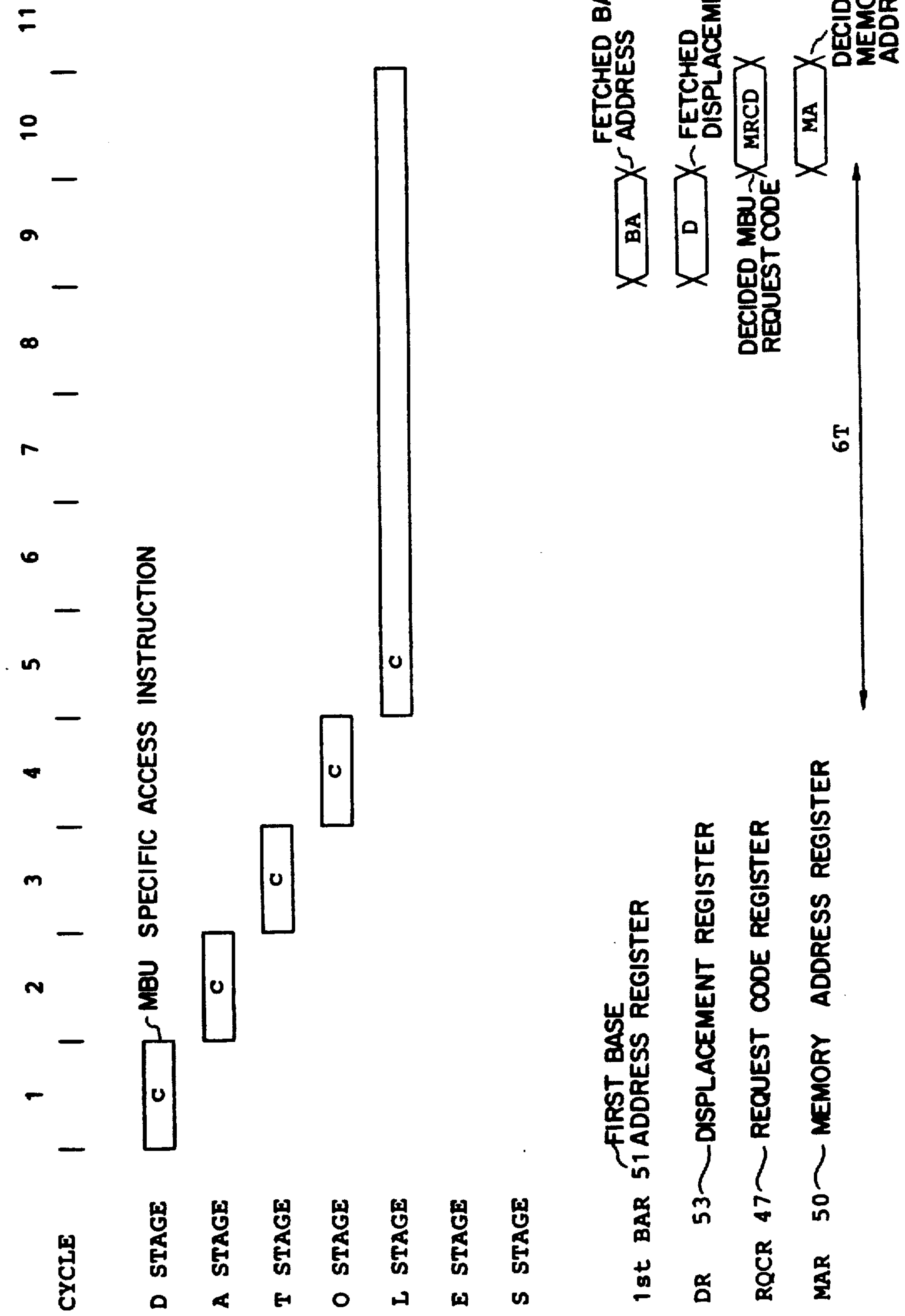
FIG. 5 is another time chart for use in describing a conventional specific access method of the prefetch control unit shown in FIG. 2.

As a reference, a conventional specific access method of the prefetch control unit 25 of FIG. 2 will be described below with reference to FIG. 5. Attention will be directed to the MBU specific access instruction denoted by c.

In the fifth machine cycle, peculiar firmware indicated by the MBU specific access instruction c starts.

In the sixth through the eighth machine cycles, the peculiar firmware fetches, as a fetched base address and a fetched displacement, a base address and a displacement which are held in the work storage 27 of the instruction execution control unit 26.

In the ninth machine cycle, the peculiar firmware sets the fetched base address (BA) and the fetched displacement (D) in the registers 51 (or 52) and 53. The address adder 48 calculates a renewed memory address in response to the fetched base address and the fetched displacement.

In the tenth machine cycle, the peculiar firmware sets an MBU request code in the request code register 47 as the decided MBU request code. Simultaneously, the renewed memory address is set in the memory address register 50 through the selector 49 as the decided memory address.

It will be now clearly understood that the conventional specific access method (FIG. 5) has a longer access time than that of the specific access method according to the present invention (FIG. 4) by six machine cycles (6T).

Figure 6:
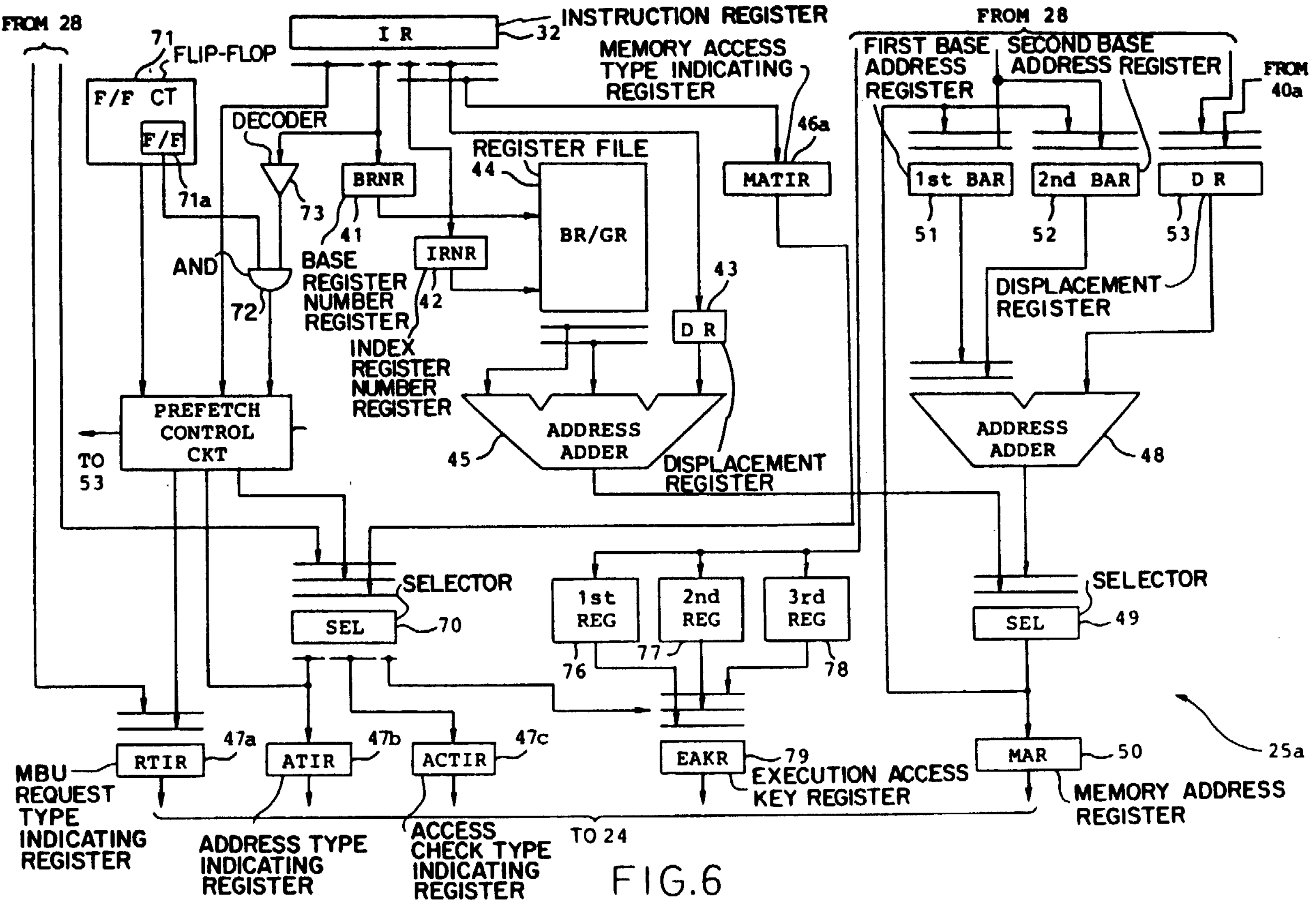
FIG. 6 is a block diagram of a modified prefetch control unit used in the data processing system depicted in FIG. 1 in carrying out a specific access method according to another embodiment of the instant invention.

Referring to FIG. 6, a modified prefetch control unit 25a comprises similar parts designated by like reference numerals. The HCSW support instructions include memory access type set instructions.

Figure 7:
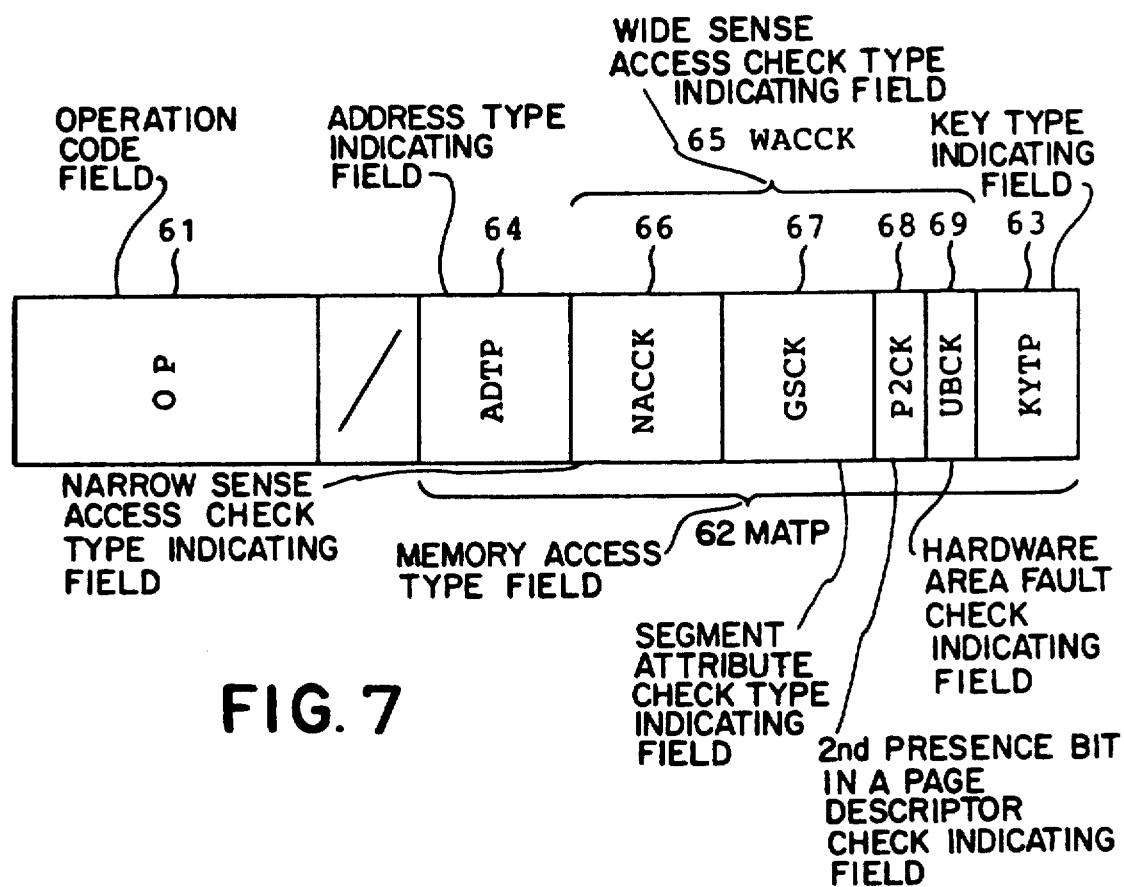
FIG. 7 shows a format of an HCSW support instruction for use in the modified prefetch control unit shown in FIG. 6.

Temporarily referring to FIG. 7, each memory access type set instruction comprises an OP field 61 and a memory access type (MATP) field 62. The MATP field 62 indicates a memory access type of the memory address set in the memory address register 50. The memory access type is used to carry out a specific memory access to the memory buffer control unit 24. The memory access type will be called indication data.

Such a memory address is indicated by the memory access type, for example, as an absolute address for use in a real machine, as first and second system name addresses, and as first through third segmentalized addresses. The first system name address is a segment which includes a process link and a process link semaphore and which will be called a G0 segment. The second system name address is a segment which includes a message link, a semaphore descriptor, and a semaphore and which will be referred to a G segment. The first segmentalized address is for use in checking a segment which includes a message link, a semaphore descriptor, and a semaphore and which will be called an SD segment. The second segmentalized address is for use in checking a segment which will be referred to a stack segment. The third segmentalized address is for use in accessing a usual segment an access check. The OP field 61 indicates an operation code for the memory access type.

The MATP field 62 comprises a key type indicating (KYTP) field 63, an address type indicating (ADTP) field 64, and an access check type in a wide sense indicating (WACCK) field 65.

The KYTP field 63 indicates an execution access key. The ADTP field 64 indicates an address type of the memory address. As described heretobefore, such a memory address may be the absolute address for use in the real machine, an absolute address for use in a virtual machine, the system name address, the segmentalized address, or the like.

The WACCK field 65 comprises an access check type in a narrow sense indicating (NACCK) field 66, a segment attribute check type indicating (GSCK) field 67, a second presence bit in a page descriptor check indicating (P2CK) field 68, and a hardware area fault check indicating (UBCK) field 69.

The NACCK field 66 indicates a type of an access check. The access check may be an instruction execution check, a write-in check, or a read-out check. The GSCK field 67 indicates a type of a segment attribute check. The segment attribute check may be a stack segment check, a gate segment check, or an SD segment check.

Turning back to FIG. 6, either the memory access type set instruction or the SW instruction is set in the instruction register 32. The modified prefetch control unit 25a comprises a modified prefetch control circuit 40a. When the memory access type set instruction is set in the instruction register 32, the modified prefetch control circuit 40a stores the MATP field 62 of the memory access type set instruction in a memory access type indicating register (MATIR) 46a. At any rate, the memory access type indicating register 46a is for holding the memory access type. The memory access type indicating register 46a holds the memory access type until issue of the next memory access type set instruction. Held in the memory access type indicating register 46a, the memory access type is sent to the three-input selector (SEL) 70. The selector 70 is supplied with memory access types from modified prefetch control circuit 40a and the firmware 28 (FIG. 1).

A flip-flop circuit 71 is for holding an operation mode of central processing unit 22. The flip-flop circuit 71 comprises a plurality of flip-flops. The flip-flops include a specific flip-flop 71a which indicates one of the SW mode and the HCSW mode. The specific flip-flop 71a produces a logic "1" level when the central processing unit 22 is operable in the HCSW mode. The specific flip-flop 71a produces a logic "0" level when the central processing unit 22 is operable in the SW mode. Contents of the flip-flop circuit 71 are sent to the modified prefetch control circuit 40a. The specific flip-flop 71a is connected to an AND gate 72.

If the SW instruction is set in the instruction register 32, a decoder 73 decodes the B field of the AS field in the SW instruction. The decoder 73 produces the logic "1" level when the B field indicates a specific number such as six. The decoder 73 is connected to the AND gate 72. Therefore, the AND gate 72 produces the logic "1" level when the central processing unit 22 is operable in the HCSW mode and when the SW instruction of the instruction register 32 has the B field indicative of the specific number. The AND gate 72 is connected to the modified prefetch control circuit 40a.

The modified prefetch control circuit 40a sends an MBU request type (RQTP) to a register 47a. The register 47a is supplied with an MBU request type from the firmware 28. The MBU request type indicates a type of a request to the memory buffer control unit 24. The request may be a memory read, a memory write, a memory test and set, or the like. The register 47a will be called an MBU request type indicating register (RTIR).

The modified prefetch control circuit 40a also sends the memory access type to the three-input selector 70 as mentioned before. The selector 70 selects, as a selected memory access type, one of the memory access type held in the memory access type indicating register 46a, the memory access type sent from the modified prefetch control circuit 40a, and the memory access type sent from the firmware 28. The address type of the selected memory access type is set in a register 47b and is sent to the modified prefetch control circuit 40a. The register 47b will be referred to as an address type indicating register (ATIR). The access check type of the selected memory access type is set in a register 47c. The register 47c will be called an access check type indicating register (ACTIR).

The MBU request type, the address type, and the access check type are collectively called an MBU request code. Therefore, the registers 47a, 47b, and 47c collectively act as a request code register for holding the MBU request code which is finally decided as a decided MBU request code. Held in the request code register, the decided MBU request code is delivered to the memory buffer control unit 24.

The key type of the selected memory access type is used as a selecting signal for selecting one of execution access keys held in first through third registers 76, 77, and 78. The first through the third registers 76, 77, and 78 are supplied with the execution access key from the firmware 28. The execution access key is used to carry out memory protection. Responsive to the key type of the selected memory access type and as a selected execution access key, a register 79 is loaded with one of the execution access keys set in the first through the third registers 76, 77, and 78. The selected execution access key is finally decided in the modified prefetch control unit 25*a* and therefore will be referred to a decided execution access key. Held in the register 79, the decided execution access key is delivered to the memory buffer control unit 24. The register 79 will be referred to as an execution access key register (EAKR).

Figure 8:
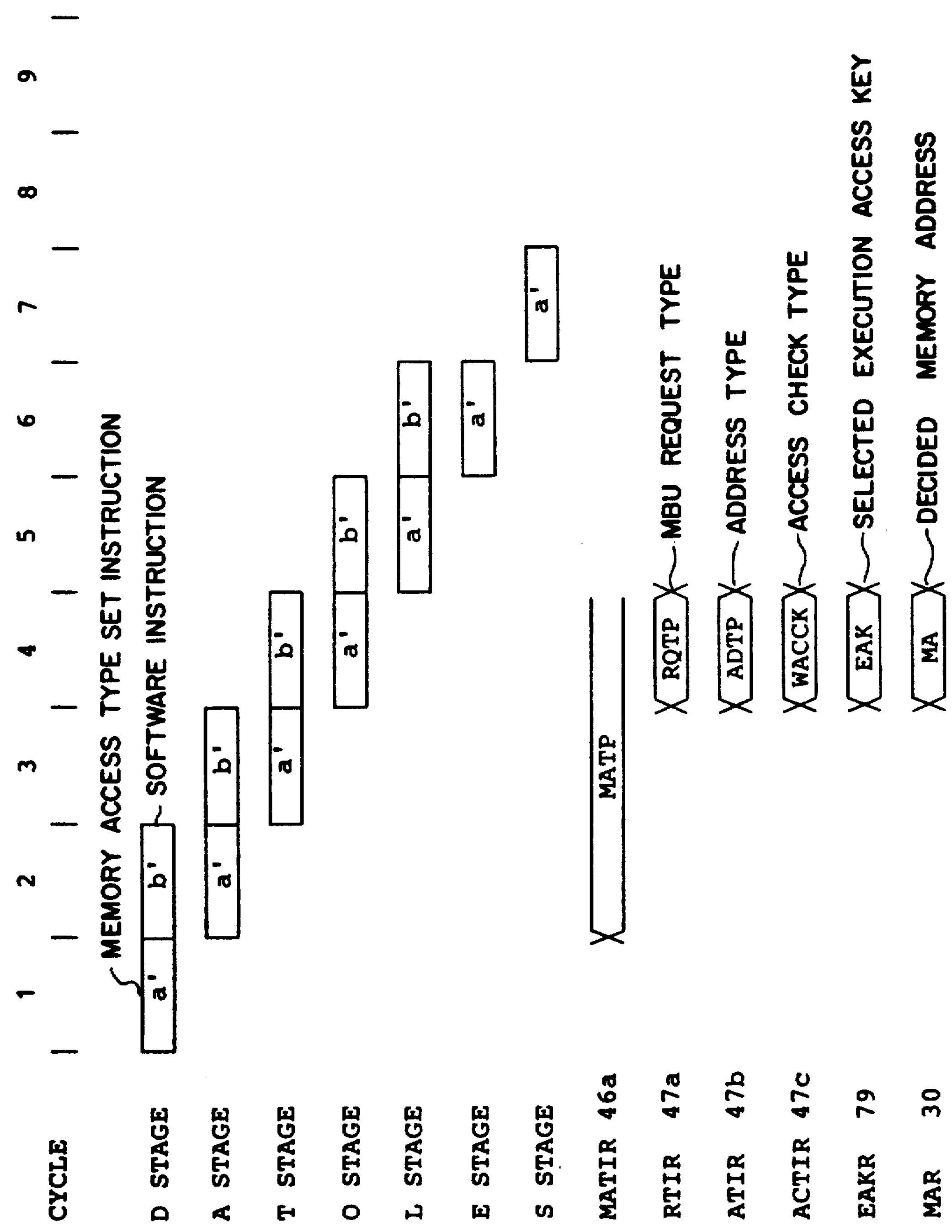
FIG. 8 is a time chart for use in describing the specific access method of the modified prefetch control unit shown in FIG. 6.

Referring now to FIG. 8, a specific access method of the modified prefetch control unit 25*a* of FIG. 6 will be described below. Attention will be directed to the memory access type set instruction (FIG. 7) and the SW instruction. The memory access type set instruction and the SW instruction will be denoted by a' and b'. It will be assumed that the SW instruction b' has the AS field including the B field indicative of six as the specific number. It will be also assumed that the central processing unit 22 is operable in the HCSW mode. Therefore, the specific flip-flop 71*a* produces the logic "1" level.

In the first machine cycle, the memory access type set instruction a' is set in the instruction register 32. The modified prefetch control circuit 40*a* decodes the OP field 61 of the memory access type set instruction a'. The modified prefetch control circuit 40*a* stores the MATP field 62 of the memory access type set instruction a' in the memory access type indicating register 46*a* in the next or the second machine cycle.

In the second machine cycle, the SW instruction b' is set in the instruction register 32. Simultaneously, the memory access type (MATP) is held in the memory access type indicating register 46*a*. The decoder 73 decodes the B field of the SW instruction b'. Inasmuch as the B field indicates six, the decoder 73 produces the logic "1" level. Accordingly, the AND gate 72 delivers the logic "1" level to the modified prefetch control circuit 40*a*. The modified prefetch control circuit 40*a* decodes the OP field of the SW instruction b'. The modified prefetch control circuit 40*a* stores the B field, the X field, and the D field in the base register number register 41, the index register number register 42, and the displacement register 43 in the next or the third machine cycle.

In the third machine cycle, the base register number, the index register number, and the displacement are set in the base register number register 41, the index register number register 42, and the displacement register 43. The address adder 45 calculates the effective address.

In the fourth machine cycle, the modified prefetch control circuit 40*a* sets the MBU request type (RQTP) in the register 47*a*. The selector 70 selects the memory access type held in the memory access type indicating register 46*a* as the selected memory access type. The address type (ADTP) of the selected memory access type is set in the register 47*b*. The access check type (WACCK) of the selected memory access type is set in the register 47*c*. Set in the registers 47*a*, 47*b*, and 47*c*, the MBU request type, the address type, and the access check type are delivered, collectively as the decided MBU request code, to the memory buffer control unit 24. Responsive to the key type (KYTP) of the selected memory access type, one of the execution access keys of the registers 76, 77, and 78 is set in the register 79 as the selected execution access key (EAK). Set in the register 79, the selected execution access key is delivered to the memory buffer control unit 24. Simultaneously, the effective address calculated by the address adder 45 is set in the memory address register 50 through the selector 49 as the decided memory address (MA). Set in the memory address register 50, the decided memory address is delivered to the memory buffer control unit 24.

By the way, it is unnecessary to issue the memory access type set instruction a' if the memory access type indicating register 46*a* is holding the memory access type in question.

Figure 9:
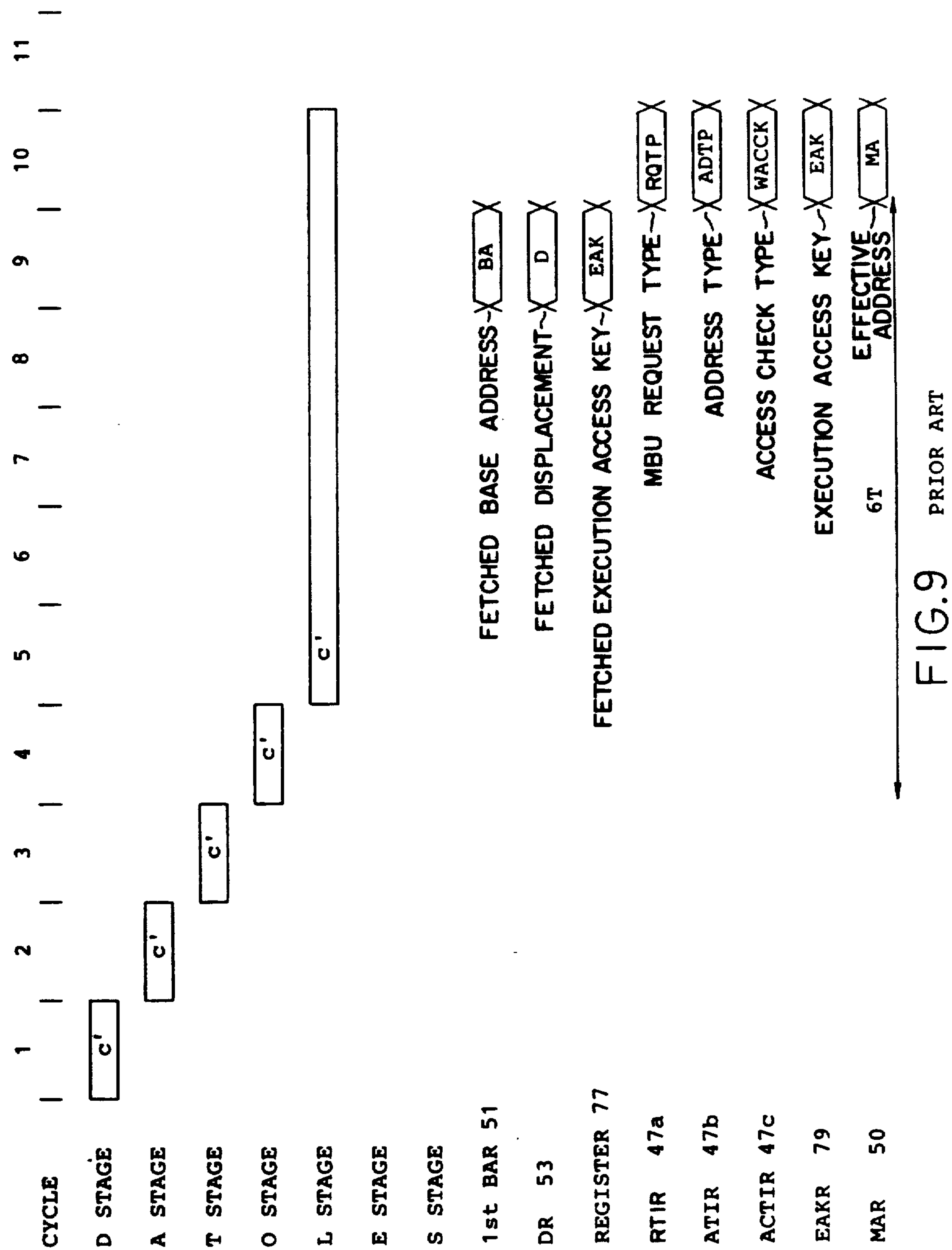
FIG. 9 is another time chart for use in describing a conventional specific access method of the modified prefetch control unit shown in FIG. 6.

As a reference, FIG. 9 will be referenced to review a conventional specific access method of the modified prefetch control unit 25*a* of FIG. 6. Attention will be directed to a specific memory access instruction which is one of the HCSW support instructions and which is denoted by c'.

In the fifth machine cycle, peculiar firmware indicated by the specific memory access instruction c' starts.

In the sixth through the eighth machine cycles, the peculiar firmware fetches, as fetched address information and fetched key information, address information and key information which are held in the work storage 27 of the instruction execution control unit 26. The fetched address information comprises a fetched base address and a fetched displacement. The fetched key information comprises a fetched execution access key.

In the ninth machine cycle, the peculiar firmware sets the fetched base address (BA) and the fetched displacement (D) in the registers 51 (or 52) and 53. The address adder 48 calculates an effective address in response to the fetched base address and the fetched displacement. Simultaneously, the peculiar firmware sets the fetched execution access key (EAK) in one of the registers 76, 77, and 78, for example, the register 77.

In the tenth machine cycle, the peculiar firmware sets an MBU request type (RQTP) in the register 47*a*. Simultaneously, the peculiar firmware sends a memory access type to the selector 70. As a selected memory access type, the selector 70 selects the memory access type sent from the peculiar firmware. An address type (ADTP) of the selected memory access type is set in the register 47*b*. An access check type (WACCK) of the selected memory access type is set in the register 47*c*. Responsive to a key type of the selected memory access type, the execution access key of the register 77 is set in the register 79 as the decided execution access key. Calculated by the address adder 48, the effective address is set in the memory address register 50 through the selector 49 as the decided memory address.

It will be now clearly understood that the conventional specific access method (FIG. 9) has an access time longer than that of the specific access method according to the present invention (FIG. 8) by six machine cycles (6T).

Figure 10A:
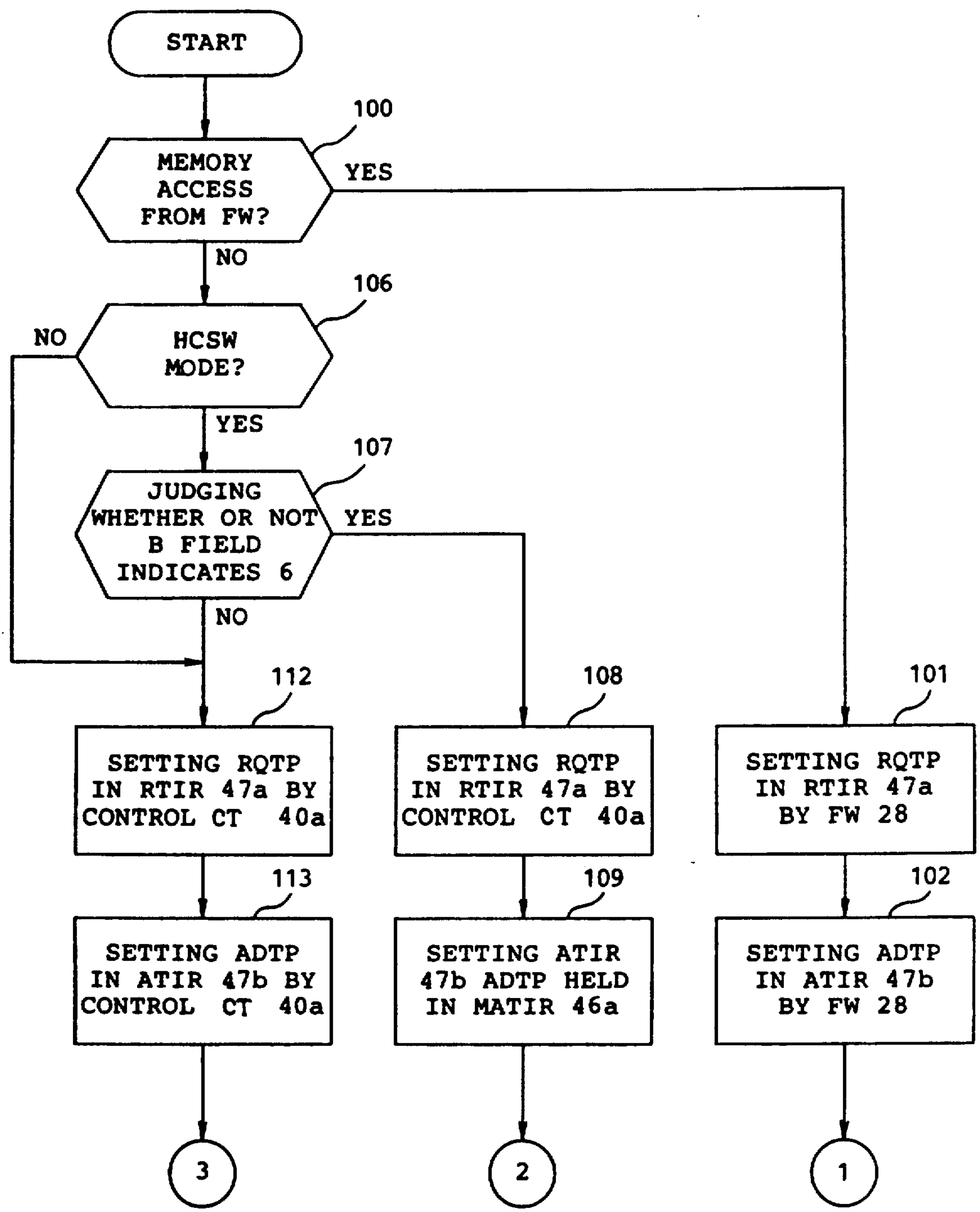
FIGS. 10(*a*) and (*b*) collectively show a flow chart for use in describing operation of the modified prefetch control unit illustrated in FIG. 6.
Figure 10B:
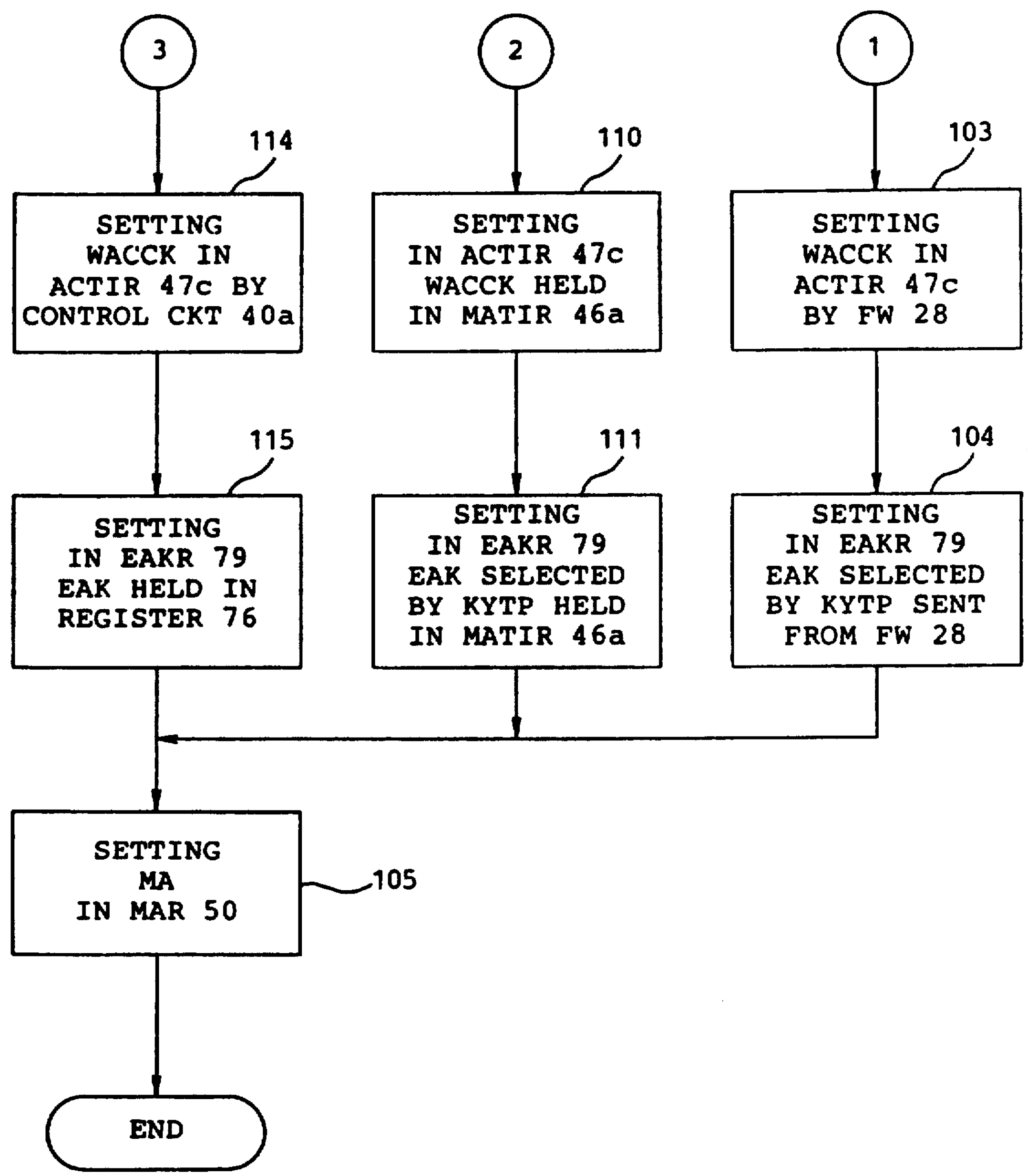

Referring to FIGS. 10(*a*) and (*b*), the description will proceed to operation of the modified prefetch control unit 25*a* of FIG. 6. It should be noted that the memory access is carried out by either the firmware (FW) 28 or the modified prefetch control circuit 40*a*. It should be also noted that the central processing unit 22 is operable in either the HCSW mode or the SW mode.

When the memory access is carried out by the firmware 28 (YES of a step 100), the registers 47a, 47b, 47c are supplied with the MBU request type, the address type, and the access check type from the firmware 28 (steps 101, 102, and 103). In the register 79 is set the execution access key selected by the key type sent from the firmware 28 (a step 104). In the memory address register 50 is set the memory address produced by using the base address and the displacement which are sent from the firmware 28 (a step 105). Therefore, the firmware 28 can indicate request information which should be sent to the memory buffer control unit 24 when the firmware 28 carries out the memory access. The request information comprises the request code, the memory address, and the execution access key.

If the memory access is carried out by the modified prefetch control circuit 40a (NO of the step 100), the step 100 is followed by a step 106 to judge whether or not the central processing unit 22 is operable in the HCSW mode. When the central processing unit 22 is operable in the HCSW mode (YES of the step 106), the step 106 is followed by a step 107 to judge whether or not the SW instruction of the instruction register 32 comprises the AS field including the B field indicative of six. When the B field indicates six (YES of the step 107), the registers 47a is supplied with the MBU request type according to the SW instruction from the modified prefetch control circuit 40a at a step 108. The MBU request type indicates, for example, a memory read, a memory write, or the like. The registers 47b and 47c are supplied with the address type and the access check type from the register 46a (steps 109 and 110). In the register 79 is set the execution access key selected by the key type sent from the register 46a at a step 111. In the memory address register 50 is set the memory address produced by using the address syllable included in the SW instruction at the step 105. Accordingly, it is possible to freely carry out the memory access equivalent to that of the firmware by using the SW instruction as long as the register 46a preliminarily holds the memory access type in question by using the memory access type set instruction.

A step 112 follows the step 106 if the central processing unit 22 is operable in the SW mode (NO of the step 106). The step 112 follows the step 107 if the B field does not indicate six (NO of the step 107). At the step 112, the MBU request type is set in the registers 47a by the modified prefetch control circuit 40a. The registers 47b and 47c are supplied with the address type and the access check type from the modified prefetch control circuit 40a (steps 113 and 114). The address type indicates the segmentalized address. The access check type indicates, for example, a usual read check, a usual write check, or the like. In the register 79 is set the execution access key held in the register 76 at a step 115. In the memory address register 50 is set the memory address produced by using the address syllable included in the SW instruction at the step 105.

What is claimed is:

1. A method of issuing a request to a memory buffer control unit from a prefetch control unit, for use in a data processing system, which allows hardware control software to perform hardware/firmware functions, said hardware control software comprising ordinary instructions available to usual software and hardware control support instructions which said usual software cannot use, said hardware control support instructions comprising a request code set instruction containing a request code field for making said memory buffer control unit carry out a specific process and a specific access instruction containing an address syllable, said request comprising a request code and a memory address, said method comprising the steps of:

(a) executing said request code set instruction in said prefetch control unit, said request code set instruction being supplied from a memory buffer control unit;
(b) generating said request code based on said request code set instruction;
(c) preliminarily holding said request code in a register in said prefetch control unit on execution of said request code set instruction;
(d) executing said specific access instruction in said prefetch control unit, said specific access instruction being supplied from said memory buffer control unit;
(e) generating said memory address based on said address syllable; and
(f) delivering said memory address and said request code as said request from said prefetch control unit to said memory buffer control unit;

whereby a user has more flexible access to said memory buffer control unit by utilizing hardware control software.

2. A method of issuing a request to a memory buffer control unit as recited in claim 1 wherein said request code set instruction is set in an instruction register in the first machine cycle, said specific access instruction is set in said instruction register in the second machine cycle, said memory address is calculated in the third machine cycle, and said request code and said memory address are delivered to said memory buffer control unit in the forth machine cycle.

3. A method of issuing a request comprising a request code and a memory address from a prefetch control unit to a memory buffer control unit for use in a data processing system, which allows hardware control software access to said memory buffer control unit to perform hardware/firmware functions, said hardware control software comprising ordinary instructions available to usual software and hardware control support instruction which said usual software cannot use, said hardware control support instructions comprising a memory access type set instruction containing a memory access type field, said ordinary instructions comprising a particular software instruction containing an address syllable, said method comprising the steps of:

(a) executing said memory access type set instruction, said memory access type set instruction containing said memory access type field indicating a specific memory access to said memory buffer control unit;
(b) generating said memory access type based on said memory access type set instruction and generating said request code comprising said memory access type;
(c) preliminarily holding said memory access type in a register on executing said memory access type set instruction;
(d) executing said particular software instruction;
(e) on executing said particular software instruction, determining whether or not said address syllable has a base register number equal to a predetermined number;

(f) generating said memory address based on said address syllable; and (g) delivering said request code and said memory address to said memory buffer control unit as said request when said base register number is equal to said predetermined number;

whereby a user has more flexible access to said memory buffer control unit by utilizing hardware control software.

4. A method of issuing a request to a memory buffer control unit as recited in claim 3 wherein said memory access type set instruction is set in an instruction register in the first machine cycle, said particular software instruction is set in said instruction register in the second machine cycle, said memory address is calculated in the third machine cycle, and said request code and said memory address are delivered to said memory buffer control unit in the fourth machine cycle.

5. A prefetch control unit for use in a data processing system, which allows hardware control software to perform hardware/firmware functions, said hardware control software comprising ordinary instructions available to usual software and hardware control support instructions which said usual software cannot use, said hardware control support instructions comprising a request code set instruction containing a request code field for making said memory buffer control unit carry out a specific process and a specific access instruction containing an address syllable, said prefetch control unit providing a request to a memory buffer control unit in response to said request code set instruction and said specific access instruction, said request comprising a request code and a memory address, said prefetch control unit comprising:

means, response to said request code set instruction for generating a request code, said request code set instruction being supplied from said memory buffer control unit, said request field being for controlling said memory buffer control unit to carry out a specific process;

a request code indicating register for preliminary storage of said request code on executing said request code set instruction;

means, responsive to said address syllable of said specific access instruction, for determining a memory address, said specific access instruction being applied from said memory buffer control unit; and means for delivering said memory address from said determining means and said request code from said request code indicating register to said memory buffer control unit as said request;

whereby a user has more flexible access to said memory buffer control unit by utilizing hardware control software.

6. A prefetch control unit as recited in claim 5 wherein said prefetch control unit is supplied with firmware from an instruction execution control unit containing firmware and said prefetch control unit further comprises:

means, responsive to firmware for generating said memory address; and means, responsive to firmware for generating said request code.

7. A prefetch control unit for use in a data processing system, said prefetch control unit issuing a request to a memory buffer control unit, which allows hardware control software access to said memory buffer control unit to perform hardware/firmware functions, sad hardware control software comprising ordinary instructions available to usual software and hardware control support instructions which said usual software cannot use, said hardware control support instructions comprising a memory access type set instruction containing a memory access type field, said ordinary instructions comprising a particular software instruction containing an address syllable, said request comprising a request code and a memory address, said control unit comprising:

means, responsive to said memory access type set instruction, for producing a memory access type;

a memory access type indicating register for preliminary storage of said memory access type on executing said memory access type set instruction, said memory access type set instruction being supplied from said memory buffer control unit said request code comprising said memory access type;

means for indicating when said address syllable in said particular software instruction has a base register number equal to a specific number;

means, responsive to said address syllable in said particular software instruction, for producing a memory address; and means, responsive to said memory access type stored in said memory access type indicating register and said memory address, for delivering said request code and said memory address to said memory buffer control unit as said request when said base register number is equal to said specific number;

whereby a user has more flexible access to said memory buffer control unit by utilizing hardware control software.

8. A prefetch control unit as recited in claim 7 further comprising a flip-flop circuit indicating whether a CPU in said data processing system is in one of a software mode or a hardware control software mode.

9. A prefetch control unit as recited in claim 8 wherein said indicating means indicates when said base register number equals a predetermined number, only when said CPU is in hardware control software mode.

* * * * *